US010982998B2

(12) United States Patent
Hackert et al.

(10) Patent No.: US 10,982,998 B2
(45) Date of Patent: Apr. 20, 2021

(54) SYSTEMS, METHODS, AND APPARATUSES FOR IN MACHINE PROFILING OF A LASER BEAM (71) Applicant: Corning Incorporated, Corning, NY (US)

(72) Inventors: Thomas Hackert, Jahnsdorf (DE); Tobias Christian Roeder, Munich (DE); Uwe Stute, Neustadt am Rübenberge (DE)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/536,559

(22) Filed: Aug. 9, 2019

(65) Prior Publication Data

US 2020/0049552 A1 Feb. 13, 2020

Related U.S. Application Data (60) Provisional application No. 62/716,589, filed on Aug. 9, 2018.

(51) Int. Cl.
 G01J 1/42 (2006.01)
 B23K 26/53 (2014.01)
 (Continued)

(52) U.S. Cl.
 CPC .......... *G01J 1/4257* (2013.01); *B23K 26/073* (2013.01); *B23K 26/53* (2015.10); *G01B 11/28* (2013.01);
 (Continued)

(58) Field of Classification Search
 CPC ...... G01J 1/4257; G01J 1/0477; G01J 1/0448; G01J 2001/4261; B23K 26/705;
 (Continued)

(56) References Cited

U.S. PATENT DOCUMENTS 5,004,890 A 4/1991 Lim
5,078,491 A * 1/1992 Johnston, Jr. ......... G01J 1/4257
 356/121
(Continued)

FOREIGN PATENT DOCUMENTS

DE 102004030607 A1 2/2006

OTHER PUBLICATIONS

Bilger et al; "Knife-Edge Scanning of an Astigmatic Gaussian Beam"; Appl. Opt. 24, 686-690 (1985.
(Continued)

*Primary Examiner* — Hao Q Pham
(74) *Attorney, Agent, or Firm* — Smit Kapadia (57) ABSTRACT A laser system includes a controller comprising a processor and a non-transitory machine-readable memory, a laser head configured to output a laser beam, a work bed positioned opposite the laser head, and a power meter communicatively coupled to the electronic control unit and integrated within the work bed. The laser system further includes a knife edge plate positioned between the power meter and the laser head, and a machine-readable instruction set stored in the non-transitory machine readable memory that causes the laser system to perform at least the following when executed by the processor: position the laser head at a distance from the power meter, cause the laser head to output the laser beam, translate the laser head across the power meter, receive power signals from the power meter as the laser beam is translated across the power meter, and calculate a spot size based on the power signals.

15 Claims, 8 Drawing Sheets

(51) Int. Cl.
*B23K 26/073* (2006.01)
*G01B 11/28* (2006.01)
*G01J 1/44* (2006.01)

(52) U.S. Cl.
CPC ......... *G01J 1/44* (2013.01); *G01J 2001/4261* (2013.01)

(58) Field of Classification Search
CPC .. B23K 26/066; B23K 26/046; B23K 26/073; B23K 26/38; B23K 26/707; B01B 11/08
USPC .............. 356/121–123; 219/121.61, 121.62, 219/121.68, 121.73, 121.83; 372/9
See application file for complete search history.

(56) References Cited

U.S. PATENT DOCUMENTS

| | | | | |
|---|---|---|---|---|
| 5,100,231 | A * | 3/1992 | Sasnett | G01J 1/4257 356/121 |
| 5,909,274 | A * | 6/1999 | Stucchi | G01J 1/4257 356/121 |
| 6,559,934 | B1 * | 5/2003 | Yee | A61F 9/00814 356/121 |
| 7,092,079 | B2 * | 8/2006 | Riza | G01J 1/4257 356/121 |
| 7,405,815 | B1 * | 7/2008 | Widen | G01J 1/4257 356/121 |
| 2006/0159151 | A1 * | 7/2006 | Mayer | B23K 26/0673 372/98 |

OTHER PUBLICATIONS

Bokalic et al; "Solar Cell Efficiency Mapping by LBIC"; 45th International Conference on Microelectronics, Devices and Materials & the Workshop on Advance Photovoltaic Decives and Technologies (2009) pp. 269-273.
ISO 11146-1; "Lasers and Laser-Related Equipment—Test Methods for Laser Beam Widths, Divergence Angles and Beam Propagation Ratios"; (2005) 23 Pages.
Keaveney; "Automated Translating Beam Profiler for In Situ Laser Beam Spot-Size and Focal Position Measurements"; Review of Scientific Instruments, 89, 035114 (2018); pp. 035114-1-035114-4.
Lopez et al; "Beam Profile Analyzer for CO2 Lasers"; Journal of Applied Research and Technology, 13(1), (2015), 586-590.
Magnes et al; "Quantitative and Qualitative Study of Gaussian Beam Visualization Techniques"; Department of Physics, U.S. Military Academy, 2008; 5 Pages.
International Search Report and Written Opinion of the European International Searching Authority; PCT/US2019/045057; dated Dec. 9, 2019; 11 Pgs.

* cited by examiner

FIG. 8

SYSTEMS, METHODS, AND APPARATUSES FOR IN MACHINE PROFILING OF A LASER BEAM

This application claims the benefit of priority to U.S. Provisional Application Ser. No. 62/716,589 filed on Aug. 9, 2018, the content of which is relied upon and incorporated herein by reference in its entirety.

TECHNICAL FIELD

The present specification generally relates to systems and methods for determining and controlling the profile of a laser beam and, more specifically, to in machine systems and methods that automatically measure and correlate the spot size of a laser beam to the laser-head-to-work-bed distance.

BACKGROUND

Laser cutting systems locally heat material with lasers to induce thermal stress in a substrate and to separate the substrate material. Some systems utilize a picosecond laser to perforate a substrate material thereby creating a damage track. These systems may then utilize a $CO_2$ laser to induce thermal stress along the damage track to separate the substrate material. However, to effectively cut a substrate material or separate the substrate material having a damage track, the laser processing head should be positioned such that an optimal spot size is incident upon the surface of the substrate to induce thermal stress within the substrate.

Accordingly, a need exists for alternative systems and methods for correlating the spot size of a cutting laser beam to the laser-head-to-work-bed distance.

SUMMARY

In embodiments, a laser system may include an electronic control unit comprising a processor and a non-transitory machine readable memory, a manipulable support communicatively coupled to the electronic control unit such that control signals generated by the electronic control unit control movement of the manipulable support, a laser head configured to output a laser beam, a work bed positioned opposite the laser head such that the laser beam output by the laser head is directed onto the work bed, a power meter communicatively coupled to the electronic control unit and integrated within the work bed, a knife edge plate positioned between the power meter and the laser head, where the knife edge plate forms a blocked portion and a transmission portion defined by a knife edge extending across the power meter, and a machine-readable instruction set stored in the non-transitory machine readable memory. The machine-readable instruction set may cause the laser system to perform at least the following when executed by the processor: position the laser head at a first distance from the power meter, cause the laser head to output the laser beam, translate the laser head across the power meter, where the laser beam is translated from the blocked portion across the knife edge into the transmission portion or the laser beam is translated from the transmission portion across the knife edge into the blocked portion, receive power signals from the power meter as the laser beam is translated across the power meter, and calculate a spot size for the laser beam based on the power signals received from the power meter.

In embodiments, a method for automatically measuring and correlating the spot size of a laser beam to the laser-head-to-work-bed distance may include positioning a laser head at a first distance from a work bed, where the work bed may include a power meter integrated within the work bed, causing the laser head to output a laser beam, translating the laser head across the power meter, where the laser beam is translated from a blocked portion across a knife edge into a transmission portion or the laser beam is translated from the transmission portion across the knife edge into the blocked portion, receiving power signals from the power meter as the laser beam is translated across the power meter, and calculating a spot size for the laser beam based on the power signals received from the power meter.

In embodiments, a laser cutting apparatus may include a manipulable support, a laser head coupled to the manipulable support and configured to output a laser beam, a work bed positioned opposite the laser head such that the laser beam output by the laser head is directed onto the work bed, a power meter integrated within the work bed, and a knife edge plate positioned between the power meter and the laser head, where the knife edge plate forms a blocked portion and a transmission portion defined by a knife edge extending across the power meter.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure relate to systems and methods for determining and controlling the profile of a laser beam, and more specifically, to in machine systems and methods that automatically measure and correlate the spot size of a laser beam to the laser-head-to-work-bed distance. Lasers for cutting a substrate may include several adjustable parameters such as wavelength, power, spot size and the like which may be optimized to induce absorption and/or thermal stress within the substrate. For example, some cutting systems locally heat a substrate with a $CO_2$ laser to introduce thermal stress and to separate the substrate material. Depending on the desired size and depth of the cut, the type of material, and the like, a laser beam may be configured to generate a particular spot size on the surface of the substrate. The spot size of the laser beam generally corresponds to the surface area of the substrate that the laser beam introduces thermal stress within. For example, $CO_2$ laser spot sizes on the substrate may vary from 1 to 10 mm in diameter, depending on the substrate being cut.

The laser beam's spot size may be adjusted by controlling the distance between the laser head and the substrate, referred to herein as "laser-head-to-work-bed distance". Embodiments described herein relate to systems and methods for automatically determining the laser-head-to-work-bed distance within a laser-cutting machine. Additionally, the systems and methods generate one or more correlation factors for the spot size of the laser beam to the laser-head-to-work-bed distance. The systems and methods described herein eliminate tedious and time-consuming calibration and setup up procedures generally required before running a cutting operation. Additionally, the systems and methods allow operators to automatically initialize a laser-cutting machine to determine one or more correlation factors such that computer numerical control (CNC) code developed for processing a substrate may be freely transferred between machines. That is, the one or more correlation factors make the spot size parameter a parameter that may be directly comparable and transferable between machines. For example, instead of the CNC code defining the distance from the laser head to the substrate for a cutting operation, the CNC code may define a desired spot size and the particular laser-cutting machine loaded with the CNC code may internally determine the necessary distance from the laser head to the substrate to generate the desired spot size.

In general, the systems and methods described herein utilize a laser-cutting machine having an integrated power meter and a knife-edge plate forming a knife-edge across a portion of the power meter. A preconfigured initialization process executed by a controller may cause the laser cutting machine to activate the laser and translate the laser head such that the laser beam output from the laser head moves across the knife edge from the knife edge plate onto the sensing area of the power meter. The power meter may generate one or more signals corresponding to the laser beam incident upon the sensing area of the power meter. The signals generated by the power meter as the laser beam is translated across the knife-edge may be used to calculate the spot size for the laser beam. The spot size may then be correlated to the laser-head-to-work-bed distance. The laser-head-to-work-bed distance may be determined through one of several methods. For example, the laser machine may be zeroed with respect to the work bed of the laser machine. In some embodiments, a ranging device may be included with the laser machine and provide distance measurements from the laser head to the work bed. The process of determining the spot size by translating the laser beam across the knife-edge may be repeated at various distances to determine a correlation between the spot size and the laser-head-to-work-bed distance across a working range for the laser machine.

Various embodiments for automatically measuring and correlating the spot size of a laser beam to the laser-head-to-work-bed distance are described in further detail below with specific reference to the appended drawings.

Figure 1:
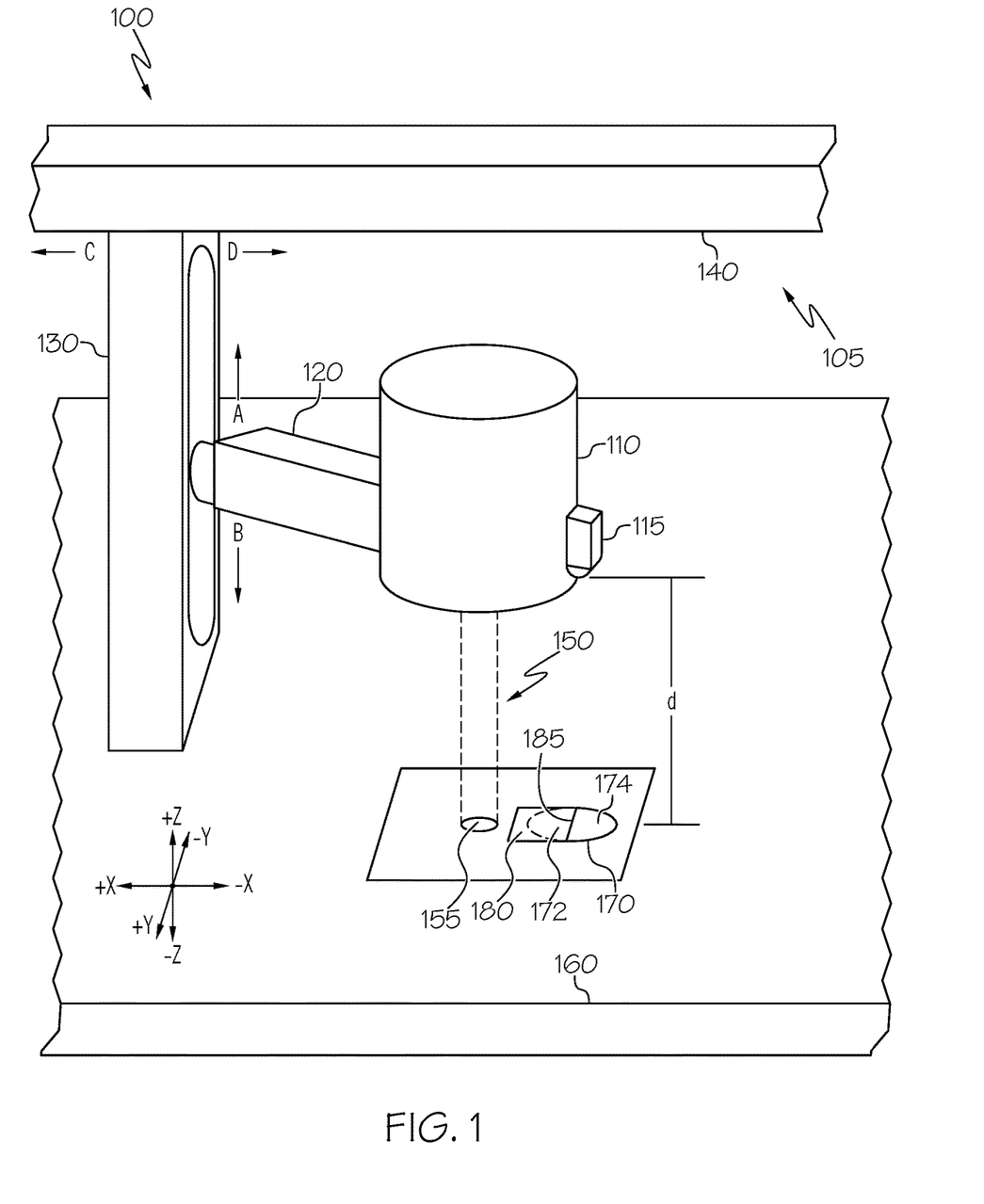
FIG. 1 schematically depicts a laser machine for cutting a substrate, according to one or more embodiments shown and described herein.

Referring now to FIG. 1, FIG. 1 schematically depicts a laser machine for cutting a substrate according to one or more embodiments described herein. As depicted, the laser machine 100 includes a laser head 110 coupled to a manipulable support 105. The manipulable support 105 may be a gantry-type system, a robotic arm, or the like. The manipulable support 105 provides support and controlled movement of the laser head 110 with one or more degrees of freedom. For example, as depicted, the manipulable support 105 includes a horizontal member 120 coupled to the laser head 110 at a first end and to a vertical member 130 at a second end opposite the first end. Additionally, the vertical member 130 couples to support structure 140, which may span the width or length of a work bed 160 of the laser machine 100. The horizontal member 120 may be coupled to the vertical member 130 such that the horizontal member 120 may move in the +Z and −Z direction along the length of the vertical member 130. For example, in embodiments, a stepper motor driving a screw gear or the like may drive the horizontal member 120 in an upward direction (i.e., in a direction indicated by arrow A) or in a downward direction (i.e., in a direction indicated by arrow B) to adjust the laser-head-to-work-bed distance d. Additionally, the vertical member 130 may be moveably coupled to the support structure 140 such that the vertical member 130 moves in the +X and −X direction along the length of the support structure 140. For example, in embodiments, a stepper motor or the like may drive the vertical member 130 in a leftward direction (i.e., in a direction indicated by arrow C) or in a rightward direction (i.e., in a direction indicated by arrow D) to translate the laser head across the knife edge 185 and power meter 170 integrated within the work bed 160 (described in further detail herein) of the laser machine.

The laser head 110 may include a laser and optics for generating and outputting a laser beam 150 capable of cutting a substrate. The laser beam 150 output by the laser head 110 includes a laser beam spot 155, which may vary in size depending on the laser-head-to-work-bed distance d. The laser may include a $CO_2$ laser, an Nd laser, an Nd:YAG laser, a high power diode laser, or the like, depending on the intended processing of the substrate, for example, cutting, engraving, welding, or the like.

As noted herein, the laser machine 100 includes a work bed 160 having a power meter 170 integrated within the work bed 160. The power meter 170 may be any sensor or sensor system capable of receiving a laser beam and generating one or more signals in response to the laser energy and/or laser power output by the laser beam. For example, the power meter may include a photodiode, a thermopile power sensor, or the like. During cutting applications, the work bed may support a substrate (not shown) such as a glass plate, glass-ceramic plate, or the like. A knife-edge plate 180 may also be supported on the surface of the work bed 160 and positioned to cover a portion of the power meter 170 such that a knife-edge 185 may be formed across the power meter 170. That is, the knife-edge plate 180 blocks a portion of the power meter 170 thereby defining a blocked portion 172 and a transmission portion 174 divided along the knife-edge 185. The knife-edge 185 may be defined by an edge such as a razor blade.

In some embodiments, the laser machine 100 may include a ranging device 115. The ranging device 115 may be coupled to the laser machine 100 and configured to determine the distance from the laser-head-to-work-bed distance d. For example, the ranging device 115 may be coupled to the laser head 110 and oriented toward the work bed 160 to generate signals corresponding to the laser-head-to-work-bed distance d. Although a ranging device 115 is depicted in FIG. 1, some laser machines 100 may utilize other means for determining the laser-head-to-work-bed distance d. For example, the laser machine 100 may implement a calibration step of zeroing the laser head 110 with respect to the work bed 160. Once zeroed the laser machine 100 may determine the laser-head-to-work-bed distance d based on the degree of rotation of the stepper motor which controls the position of the horizontal member 120 and the laser 110 along the length of the vertical member 130. That is, the degree of rotation of the stepper motor may correspond to a predetermined linear displacement of the horizontal member 120 with respect to the vertical member 130 in the +Z and −Z directions.

Figure 2:
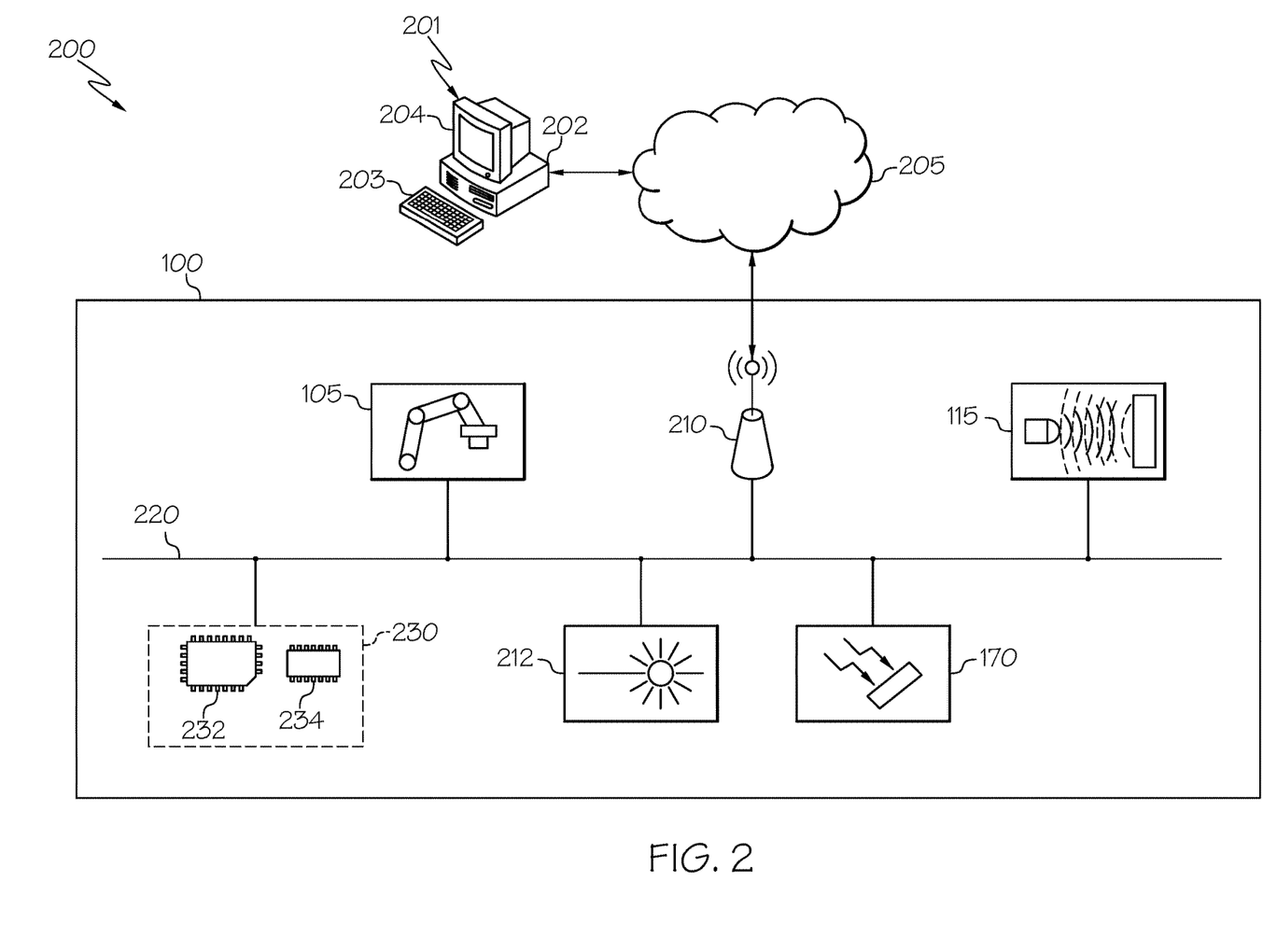
FIG. 2 schematically depicts an example system for automatically measuring and correlating the spot size of a laser beam to the laser-head-to-work-bed distance, according to one or more embodiments shown and described herein.

Referring now to FIG. 2, an example system for automatically measuring and correlating the spot size of a laser beam to the laser-head-to-work-bed distance according to one or more embodiments is depicted. The system 200 generally includes a laser machine 100 and a computing device 201. Referring to FIGS. 1 and 2, the laser machine includes a communication path 220, an electronic control unit 230 having a processor 232 and a non-transitory computer readable memory 234, a manipulable support 105, network interface hardware 210, a laser 212, a ranging device 115, and a power meter 170. The laser machine 100 may be communicatively coupled to a network 205 by way of the network interface hardware 210. The components of the system 200 may be contained within the laser machine 100 or interconnected with each other through the network 205. The various components of the system 200 and the interaction thereof will be described in detail below.

The communication path 220 may be formed from any medium capable of transmitting a signal such as, for example, conductive wires, conductive traces, optical waveguides, or the like. The communication path 220 may also refer to the expanse in which electromagnetic radiation and their corresponding electromagnetic waves traverses. Moreover, the communication path 220 may be formed from a combination of mediums capable of transmitting signals. In one embodiment, the communication path 220 comprises a combination of conductive traces, conductive wires, connectors, and buses that cooperate to permit the transmission of electrical data signals to components such as processors, memories, sensors, input devices, output devices, and communication devices. Accordingly, the communication path 220 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 220 communicatively couples the various components of the system 200. As used herein, the term "communicatively coupled" means that coupled components are capable of exchanging signals with one another such as, for example, electrical signals via conductive medium, electromagnetic signals via air, optical signals via optical waveguides, and the like.

Still referring to FIGS. 1 and 2, the electronic control unit 230 may be any device or combination of components comprising a processor 232 and non-transitory computer readable memory 234. The processor 232 of the system 200 may be any device capable of executing the machine-readable instruction set stored in the non-transitory computer readable memory 234. Accordingly, the processor 232 may be an electric controller, an integrated circuit, a microchip, a computer, or any other computing device. The processor 232 may be communicatively coupled to the other components of the system 200 by the communication path 220. Accordingly, the communication path 220 may communicatively couple any number of processors 232 with one another, and allow the components coupled to the communication path 220 to operate in a distributed computing environment. Specifically, each of the components may operate as a node that may send and/or receive data. While the embodiment depicted in FIG. 2 includes a single processor 232, other embodiments may include more than one processor 232.

The non-transitory computer readable memory 234 of the system 200 may be coupled to the communication path 220 and communicatively coupled to the processor 232. The non-transitory computer readable memory 234 may comprise RAM, ROM, flash memories, hard drives, or any non-transitory memory device capable of storing machine-readable instructions such that the machine-readable instructions can be accessed and executed by the processor 232. The machine-readable instruction set may comprise logic or algorithm(s) written in any programming language of any generation (e.g., 1GL, 2GL, 3GL, 4GL, or 5GL) such as, for example, machine language that may be directly executed by the processor 232, or assembly language, object-oriented programming (OOP), scripting languages, microcode, etc., that may be compiled or assembled into machine readable instructions and stored in the non-transitory computer readable memory 234. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 234, other embodiments may include more than one memory module.

The manipulable support 105 may be communicatively coupled to the electronic control unit 230 via the communication path 220. As discussed above, the manipulable support 105 supports and controls the movement of the laser head 110. The manipulable support 105 may be a gantry-type system, a robotic arm, or the like. The manipulable support 105 may include one or more stepper motors or the like for controlling the movements of the laser head 110 within one or more degrees of freedom. The one or more stepper motors may be communicatively coupled to the electronic control unit 230 such that the electronic control unit 230 transmits control signals to the one or more stepper motors for controlling the movement of the manipulable support 105. It should be understood that although FIGS. 1 and 2 depict and describe a manipulable support 105 with reference to a gantry-type structure, other structures may be implemented to achieve support and controlled movement of the laser head 110.

Still referring to FIGS. 1 and 2, the laser 212 is optionally housed within the laser head 110 and communicatively coupled to the electronic control unit 230. The laser 212 may be a $CO_2$ laser, an Nd laser, an Nd:YAG laser, a high power diode laser, or the like. The type of laser depends on the laser process being implemented. For example, for cutting a glass substrate a $CO_2$ laser may be selected. The electronic control unit 230 may generate control signals for controlling the laser 212. For example, the control signals may activate or deactivate the laser 212, adjust the power output of the laser, or the like.

The laser machine 100 may include a ranging device 115. The ranging device 115 may be any device capable of determining a distance to an object or surface. For example, the ranging device 115 may implement active range-finding methods such as laser, radar, sonar, LIDAR, and/or ultrasonic range-finding. In embodiments, the ranging device 115 may include a laser (e.g., a laser range finder) for outputting a laser emission and a laser detector for detecting the reflection of the laser emission from an object or surface. For systems and methods described herein, the ranging device 115 may be coupled to the laser head 110 and positioned to generate a signal in response to determining a distance to the work bed 160 of the laser machine 100.

The system 200 further includes a power meter 170 as discussed above with respect to FIG. 1. The power meter 170 may be communicatively coupled to the electronic control unit 230 such that signals generated by the power meter 170 corresponding to the detected power of the laser beam 150 are transmitted to the electronic control unit 230. The power meter 170 may be any device capable of detecting a laser beam 150 and generating an electronic signal corresponding to the power of the laser beam 150 that is incident on the sensor of the power meter 170. For example, the power meter 170 may include a CCD array, a photodiode, a thermopile power sensor or the like for measuring the laser beam 150 transmitted through the transmission portion 174. In some embodiments, the power meter 170 may be a beam-profiling sensor or an energy sensor.

As described with reference to FIG. 1, a power meter 170 may be integrated within the work bed 160 of the laser machine 100 such that the laser beam 150 output from the laser head 110 may be focused onto the power meter 170. Such a configuration allows the spot size of the laser beam spot 155 generated by the laser beam to be measured in its operational configuration. That is, when a substrate is to be laser processed, the substrate may be placed on the work bed 160. Accordingly, the correlated spot size to laser-head-to-work-bed distance d is translatable between the measured spot size with respect to the work bed 160 and the substrate by accounting for the thickness of the substrate.

The network interface hardware 210 may be coupled to the communication path 220 and communicatively coupled to the processor 232. The network interface hardware 210 may be any device capable of transmitting and/or receiving data via a network 205. Accordingly, the network interface hardware 210 can include a communication transceiver for sending and/or receiving any wired or wireless communication. For example, the network interface hardware 210 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 210 includes hardware configured to operate in accordance with the Bluetooth wireless communication protocol. In another embodiment, network interface hardware 210 may include a Bluetooth send/receive module for sending and receiving Bluetooth communications to/from a network 205.

In some embodiments, the system 200 may be communicatively coupled to a computing device 201 via the network 205. In some embodiments, the network 205 may be a personal area network that utilizes Bluetooth technology to communicatively couple the system 200 and the computing device 201. The network 205 may include one or more computer networks (e.g., a personal area network, a local area network, or a wide area network), cellular networks, satellite networks and/or a global positioning system and combinations thereof. Accordingly, the system 200 can be communicatively coupled to the network 205 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, as stated above, the network 205 may be utilized to communicatively couple the system 200, and more specifically the laser machine 100 with the computing device 201. The computing device 201 may include a processing unit 202, an input device 203, and a display 204, each of which may be communicatively coupled to together and/or to the network 205. The computing device 201 may be used to interface with the laser machine 100. For example, a user, using the computing device 201 may select and load a CNC code for processing a substrate with the laser machine 100. The computing device 201 may also receive signals from the power meter 170 for automatically measuring and correlating the spot size of the laser beam to the laser-head-to-work-bed distance. The computing device 201 may also be used to control the laser machine 100 and otherwise monitor the functionality of the system 200.

The computing device 201 may include a processing unit 202 having a processor and memory, an input device 203, and a display 204. The memory may be machine-readable memory (which may also be referred to as a non-transitory processor readable memory). The memory may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory may be configured to store CNC code, correlation factors for the laser machine, and operating logic as described in more detail herein.

The processor may include any processing component(s) configured to receive and execute programming instructions (such as from a data storage component and/or the memory). The instructions may be in the form of a machine-readable instruction set stored in the data storage component and/or the memory. The input device 203 may include a keyboard, mouse, camera, microphone, speaker, and/or other device for receiving data. The computing device 201 may also include network interface hardware including for enabling communication with the network 205 and the laser machine 100.

It should be understood that while the computing device 201 is depicted as personal computers, these are merely examples. More specifically, in some embodiments, any type of computing device (e.g., mobile computing device, personal computer, server, and the like) may be utilized for the computing device 201. Additionally, while the computing device 201 is illustrated in FIG. 2 as a single piece of hardware, this is also an example. More specifically, the computing device 201 may represent a plurality of computers, servers, databases, and the like.

The following sections will now describe embodiments of the operation of the system 200 for automatically measuring and correlating the spot size of a laser beam to the laser-head-to-work-bed distance.

Figure 3A:
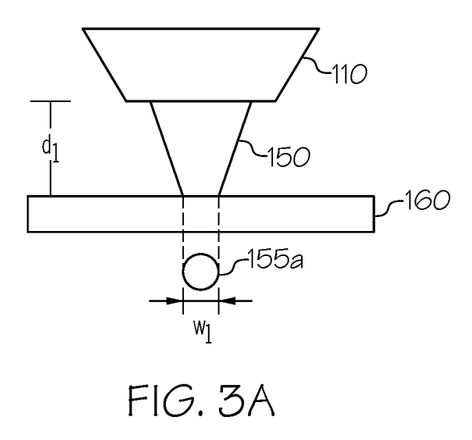
FIG. 3A schematically depicts a cross-sectional view of a laser head at a first distance from the work bed of the laser machine, according to one or more embodiments shown and described herein.
Figure 3B:
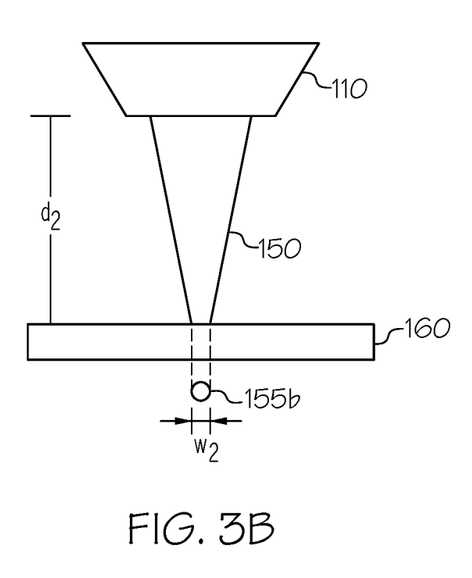
FIG. 3B schematically depicts a cross-sectional view of a laser head at a second distance from the work bed of the laser machine, according to one or more embodiments shown and described herein.

Referring to FIGS. 3A and 3B, schematic cross-sectional views of a laser head 110 at various distances ($d_1$, $d_2$) from the work bed 160 of the laser machine 100 are depicted, according to one or more embodiments described herein. FIGS. 3A and 3B depict a laser head 110 outputting a laser beam 150. The laser beam 150 is incident on the surface of the work bed 160 forming a laser spot thereon. As depicted in FIG. 3A, when the laser head 110 is positioned at a first distance $d_1$ from the work bed 160 a beam spot 155a having a first spot size may be formed by the laser beam 150 having a first width $w_1$ is generated. Similarly, as depicted in FIG. 3B, when the laser head 110 is positioned at a second distance $d_2$ from the work bed 160 a beam spot 155b having a second spot size may be formed by the laser beam 150 having a second width $w_2$ is generated. Accordingly, in some embodiments, as the distance ($d_1$, $d_2$) between the laser head 110 and the work bed 160 (or the substrate as may be the case during a laser processing operation) increases, the spot size ($w_1$, $w_2$), may decrease. In some embodiments, although not depicted, as the distance ($d_1$, $d_2$) between the laser head 110 and the work bed 160 (or the substrate as may be the case during a laser processing operation) decreases, the spot size ($w_1$, $w_2$), may increase. In some embodiments, although not depicted, as the distance ($d_1$, $d_2$) between the laser head 110 and work bed 160 increases, the spot size ($w_1$, $w_2$) may also increase. In yet further embodiments, as the distance ($d_1$, $d_2$) between the laser head 110 and work bed 160 decreases, the spot size ($w_1$, $w_2$) may also decrease.

To measure and correlate the spot size of a laser beam to the laser-head-to-work-bed distance, the laser machine 100 may be configured to complete one or more power profiling measurements at a predefined distance d (FIG. 1). Furthermore, to characterize a laser machine across the working range of the laser machine two or more power profiling measurements may be completed with at least two different distances ($d_1$, $d_2$).

Methods of automatically measuring and correlating the spot size of the laser beam to the laser-head-to-work-bed distance d by utilizing one or more power profiling measurements will now be described in detail. In general, to determine the spot size (i.e., the beam width) incident upon the work bed 160 and/or the power meter 170, the laser beam 150 may be moved over the knife edge 185 such that a power profile may be created from the power signals generated by the power meter 170. The spot size (i.e., the beam width) of the laser beam 150 can be calculated from the power profile.

Figure 4:
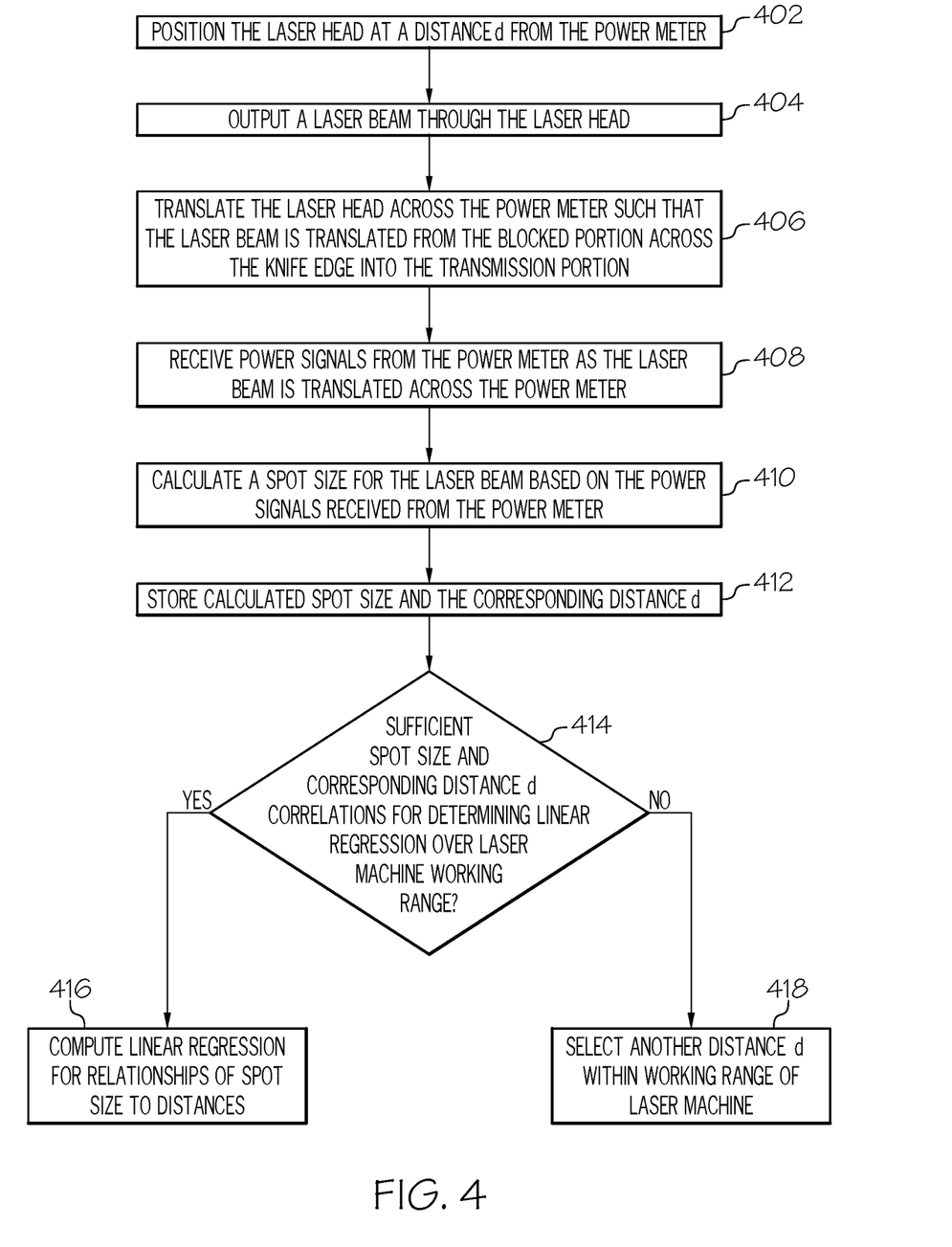
FIG. 4 depicts a flowchart for an example method of automatically measuring and correlating the spot size of a laser beam to the laser-head-to-work-bed distance, according to one or more embodiments shown and described herein.

Referring now to FIG. 4, a flowchart of an example method of automatically measuring and correlating the spot size of a laser beam to the laser-head-to-work-bed distance, according to one or more embodiments is depicted. The steps of the method may be defined in a set of machine-readable instructions stored in the memory of the electronic control unit or a computing device such that a processor may access and execute the steps. At step 402, the laser head may be positioned at a distance d from the power meter. This may be accomplished by controlling the upward and/or downward movement of the horizontal member, thereby adjusting the distance the laser head is from the work bed. As discussed above, the distance may be confirmed based on the degrees of rotation of a stepper motor from a zeroed position or by utilizing a ranging device, which may provide a signal corresponding to the laser-head-to-work-bed (e.g., the power meter as the power meter may be integrated within the work bed) distance d. At step 404, the electronic control unit may cause the laser beam to be output from the laser head. At step 406, the laser head may be translated across the power meter such that the laser beam may be translated from the blocked portion across the knife-edge into the transmission portion of the power meter. In some embodiments, at step 406, the laser head may be translated across the power meter such that the laser beam may be translated from the transmission portion of the power meter across the knife-edge into the blocked portion of the power meter. That is, the system and/or apparatus may be configured to translate the laser head between the blocked portion and the transmission portion across the knife-edge to generate a profile of the laser beam output through the laser head. Referring briefly back to FIG. 1, for example, the vertical member of the manipulable support may be automatically moved by a stepper motor or the like along the support structure in the +X and −X directions such that the laser head and laser beam output from the laser head are translated across the power meter and knife edge integrated with the work bed. At step 408, as the laser beam is translated across the power meter, the power meter generates power signals corresponding to the power value of the laser beam. Each power signal generated by the power meter corresponds to a shift (e.g., a micrometer step) in the laser beam (e.g., in the −X direction, FIG. 1). The electronic control unit and/or a computing device may receive the power signals. At step 410, the electronic control unit and/or the computing device may calculate the spot size for the laser beam (which may also be referred to as the beam width) based on the power signals received from the power meter. Methods for calculating the spot size for the laser beam will be described in more detail with reference to FIG. 5.

At step 412, the calculated spot size and the corresponding laser head to power meter distance d may be stored in the memory or a data storage device of the electronic control unit and/or the computing device. The calculated spot size may be later used to generate a linear regression model and function corresponding to the spot size to distance correlation for the particular laser machine. In the event a correlation between the spot size and the distance from the laser head to the work bed for the workable range of the particular machine is desired, rather than for just a single distance, the method may proceed at step 414. At step 414, a determination may be made as to whether there are a sufficient number of spot size measurements for a set of laser-head-to-work-bed distances to generate a linear regression for the working range of the laser machine. For example, two or more spot size and distance measurements may be needed to calculate the linear regression. The linear regression will provide a correlation for all spot sizes and distances across the working range of the laser machine. In some embodiments, at least 3 or at least 4 spot size measurements for at least 3 or at least 4 different distances may be used to establish a correlation between the laser-head-to-work-bed distance and laser beam spot sizes across the working range of the laser machine. As used herein, "working range" refers to the possible +Z and −Z displacements for the laser head for a particular laser machine.

If there are sufficient spot size measurements for different laser-head-to-work-bed distances, then at step 416 a linear regression for the relationship of spot size to distances is computed. If there are an insufficient number of spot size measurements for different distances stored in the electronic control unit and/or the computing device for the particular laser machine, then at step 418, another laser-head-to-work-bed distance d may be determined and the process returns to step 402 to obtain another spot size measurement for a second laser-head-to-work-bed distance d.

In some embodiments, the system may be preconfigured to automatically perform the translation and measurement of the laser beam power from multiple distances in sequence. For example, upon initializing the laser machine before a cutting process, these steps may be executed and the correlation (i.e., a linear or polynomial function representing the relationship between all distances of the laser head to work bed within a working range of a laser machine to the generated spot size for each) computed. The computed correlation based on the linear regression calculation may render a linear function that can be compared to an older correlation or stored in the laser system for use during the subsequent cutting process. In the event a new correlation and an older correlation differ, a third correlation may be computed to determine whether the older correlation should be discarded or whether there may be an issue with the new correlation or laser setup.

Figure 5:
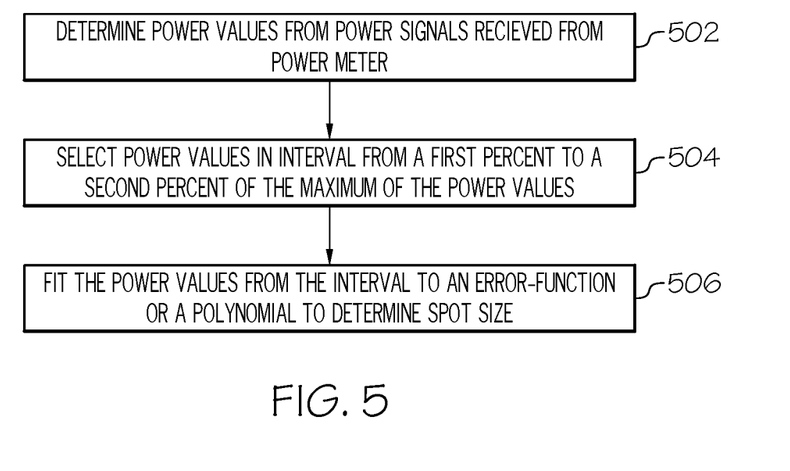
FIG. 5 depicts a flowchart for another example method of automatically measuring and correlating the spot size of a laser beam to the laser-head-to-work-bed distance, according to one or more embodiments shown and described herein.

Referring now to FIG. 5, a flowchart of an example method of automatically measuring and correlating the spot size of a laser beam to the laser-head-to-work-bed distance, according to one or more embodiments is depicted. In particular, the method depicted in the flowchart provides a more detailed example of calculating the spot size of the laser beam from the power signals received from the power meter. At step 502, the electronic control unit and/or the computing device may determine power values from the power signals received from the power meter. At step 504, a select interval of power values are extracted from the power values collected from before any portion of the laser beam was translated across the knife edge to the point where the laser beam was completely within the transmission portion of the power meter (i.e., the maximum amount of power was being sensed by the power meter). In some embodiments, the power values are collected within an interval defined by a first percentage of the maximum measured power and a second percentage of the maximum measured power. For example, the first percentage may be any value from 0% of the maximum measured power to 100% of the maximum measured power and the second percentage may be any value from 0% of the maximum measured power to 100% of the maximum measured power, such that the first and second percentage values are different. More particularly, the first percentage may be about 5%, 6%, 7%, 8%, 9%, 10%, 11%, 12%, 13%, 14%, 15%, 16%, 17%, 18%, 19%, or 20% of the maximum measured power. In some embodiments, the first percentage may be about 15.0%, 15.1%, 15.2%, 15.3%, 15.4%, 15.5%, 15.6%, 15.7%, 15.8%, 15.9% or 16.0%, or optionally 15.87% of the maximum measured power. The second percentage may be about 75%, 76%, 77%, 78%, 79%, 80%, 81%, 82%, 83%, 84%, 85%, 86%, 87%, 88%, 89%, 90%, 91%, 92%, 93%, 94%, or 95% of the maximum measured power. In embodiments, the second percentage may be about 84.0%, 84.1%, 84.2%, 84.3%, 84.4%, 84.5%, 84.6%, 84.7%, 84.8%, 84.9%, 85.0%, or optionally 84.14% of the maximum measured power.

At step 506, the power values may be fit to an error-function or a polynomial to determine the spot size. More specifically, once the power values are fit to the error-function or the polynomial, the spot size may be determined by the absolute value of the shift (e.g., the x-shift, referring to FIG. 1), of the laser beam from the power value associated with the first percentage value to the power value associated with the second percentage value. The error function may be defined by Eq. 1 below.

$$\mathrm{erf}(x) = \frac{1}{\sqrt{\pi}} \int_{-x}^{x} e^{-t^2} dt \qquad \text{Eq. 1}$$

In some embodiments, the width of the spot size may be determined by taking the derivative of two adjacent data points utilizing the Eq. 2 below.

$$\frac{dP_T}{dx} = \frac{1}{2}\left(\frac{y_{i+1} - y_i}{x_{i+1} - x_i} + \frac{y_i - y_{i-1}}{x_i - x_{i-1}}\right) \qquad \text{Eq. 2}$$

Eq. 2 gives the power at a particular point x in the beam. This type of derivative may be calculated leaving two options for finding the $1/e^2$ radius, r. First, an estimate may be made by dividing the maximum value in the derivative plot by $e^2$ and finding the corresponding r-value by linear extrapolation between points. The second option, involves fitting a Gaussian to the data. This allows for an assessment of the experimental error associated with the fit.

Figure 6:
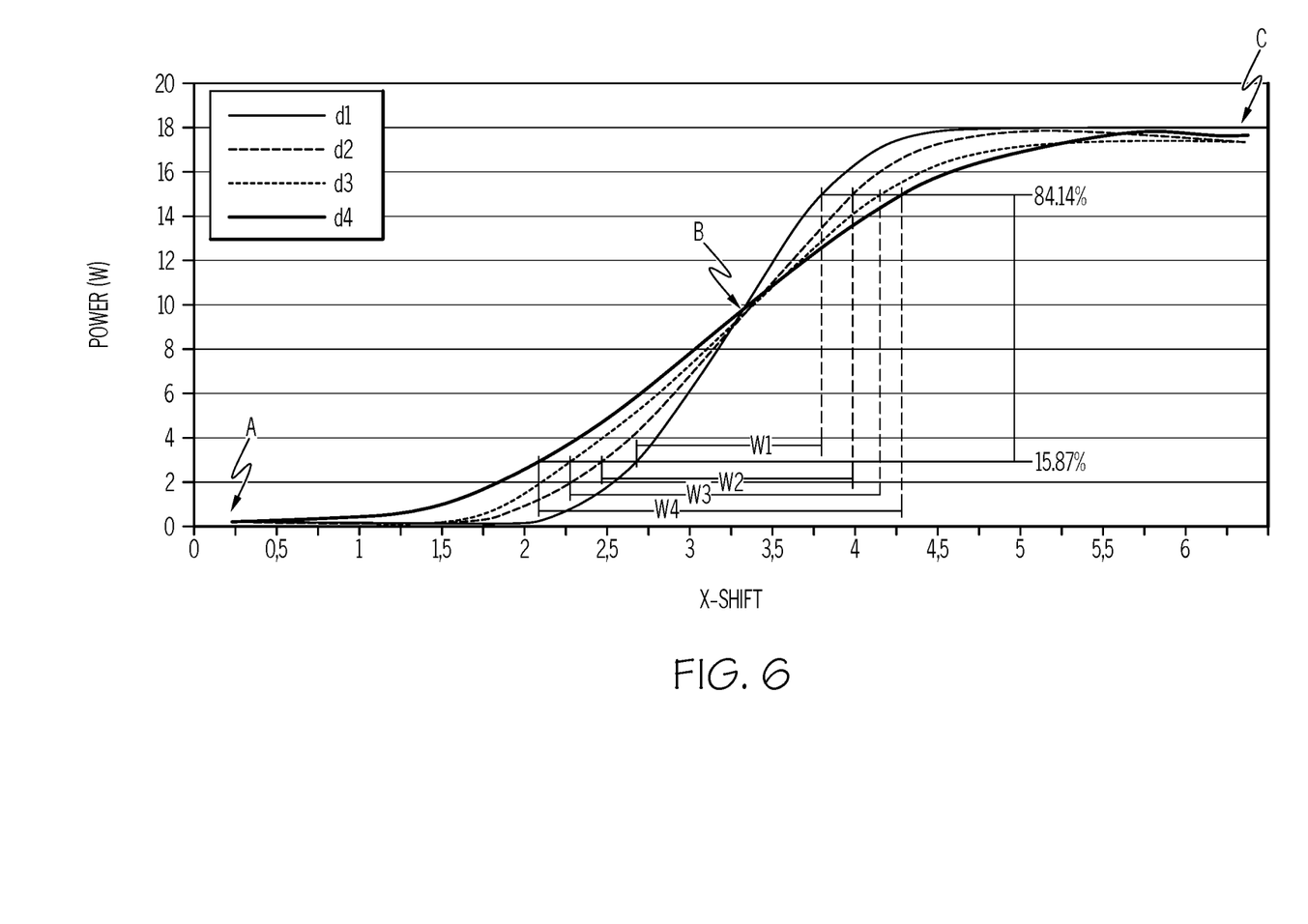
FIG. 6 depicts an illustrative example of determining the spot size from power values measured by the power meter, according to one or more embodiments shown and described herein.

FIG. 6 provides a more comprehensive explanation for determining the spot size by illustrating the process through a graph depicting power profile curves (i.e., power values fit using an error-function) generated at different laser-head-to-work-bed distances. Additionally, FIGS. 7A, 7B, and 7C, which will be subsequently described, provide illustrative examples of the laser beam as it translates from the blocked portion across the knife-edge and into the transmission portion. Each of FIGS. 7A, 7B, and 7C correspond to locations A, B, and C denoted on the illustrative graph depicted in FIG. 6. Referring to FIG. 6, the illustrated graph includes four power profile curves for four different laser-head-to-work-bed distances ($d_1$, $d_2$, $d_3$, $d_4$). To determine the spot size (e.g., the width and/or diameter of the spot size), the power values for a first percentage and a second percentage of the maximum power value are determined. For example, assuming 18 W is the maximum power value and the first percentage is 15.87%, then the first power value is 2.856 W. For illustrative purposes, a horizontal line is drawn at first power value of 2.856 W on the graph indicated by 15.87%. Next, the second percentage of 84.14% defines a second power value of 15.14 W. Again for illustrative purposes a line is drawn at the second power value 15.14 W that intersects the power profile curves (i.e., indicated by 84.14%). By taking the intersection of the first percentage and second percentage of the maximum power and the power profile curves for each laser beam output by the laser head at the respective distances ($d_1$, $d_2$, $d_3$, $d_4$), the corresponding laser spot size may be determined. That is, when the laser head is at a distance $d_1$ the laser beam has a spot size $w_1$, when the laser head is at a distance $d_2$ the laser beam has a spot size $w_2$, when the laser head is at a distance $d_3$ the laser beam has a spot size $w_3$, and when the laser head is at a distance $d_4$ the laser beam has a spot size $w_4$.

The spot size ($w_1$, $w_2$, $w_3$, $w_4$) may be determined from the displacement of the laser beam, which corresponds to the lateral motion of the laser head along the X-axis (e.g., depicted in FIG. 1), from the first X-axis value where the power meter measured the first power value to the second X-axis value where the power meter measured the second power value. As referred to herein, the difference between the second X-axis value and the first X-axis value is referred to as the "X-shift." By way of example, taking the power profile curve for the laser beam at distance $d_1$, the first X-axis value at the first power value is about 2.7 and the second X-axis value at the second power value is about 3.8. Therefore, the X-Shift may be determined by subtracting the second X-axis value (i.e., 3.8) from the first X-axis value (i.e., 2.7), which results in 1.1. The spot size for the laser beam at distance $d_1$ is 1.1 units. It is noted that FIG. 6 does not include a unit of measure, as the chart is merely an illustrative example for determining the spot size. However, the X-Shift may refer to units of measure of distance on the order of micrometers, millimeters, centimeters, or the like depending on the type and focusing optics of laser being measured.

Figure 7A:
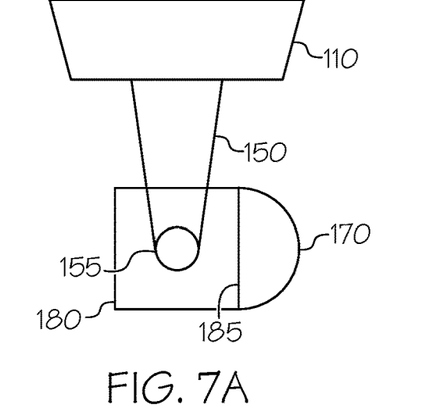
FIG. 7A depicts an illustrative example of the laser beam positioned over the blocked portion as it is translated from the blocked portion across the knife-edge and into the transmission portion, according to one or more embodiments shown and described herein.
Figure 7B:
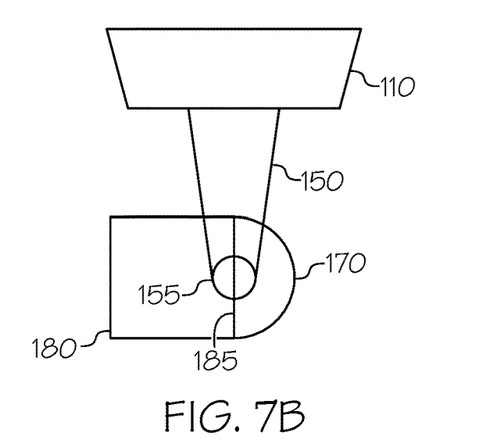
FIG. 7B depicts an illustrative example of the laser beam positioned over the knife-edge as it is translated from the blocked portion across the knife-edge and into the transmission portion, according to one or more embodiments shown and described herein.
Figure 7C:
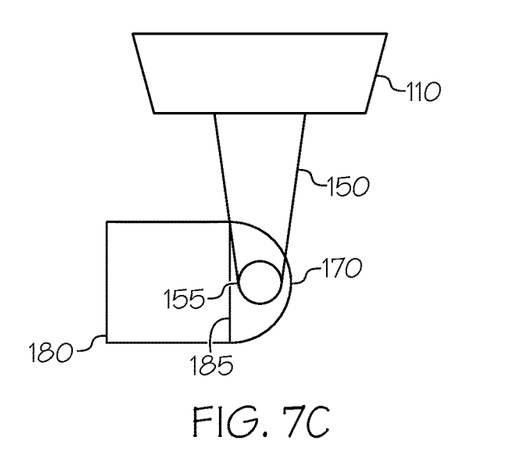
FIG. 7C depicts an illustrative example of the laser beam positioned over the transmission portion as it is translated from the blocked portion across the knife-edge and into the transmission portion, according to one or more embodiments shown and described herein.

As mentioned above, FIGS. 7A, 7B and 7C depict illustrative examples of the laser beam as it translates from the blocked portion across the knife-edge and into the transmission portion. Each of FIGS. 7A, 7B, and 7C correspond to locations A, B, and C denoted on the illustrative graph depicted in FIG. 6. FIG. 7A corresponds to location A on the graph of FIG. 6, which indicates a zero power value since the laser beam 150 is completely over the blocked portion 172 of the knife-edge plate 180. The knife-edge plate 180 blocks transmission of the laser beam to the power meter 170. FIG. 7B corresponds to location B on the graph of FIG. 6, which represents the point at which half of the laser beam is within the blocked portion 172 and the other half has crossed the knife-edge 185 into the transmission portion 174. The transmission portion 174 allows the laser beam to transmit to the power meter 170, thus the graph depicts a power value of about 9 W, (i.e., about ½ of the maximum power value). FIG. 7C corresponds to location C on the graph of FIG. 6, which represents a position where the laser beam is fully within the transmission portion 174 and the power meter is detecting a maximum power level.

Figure 8:
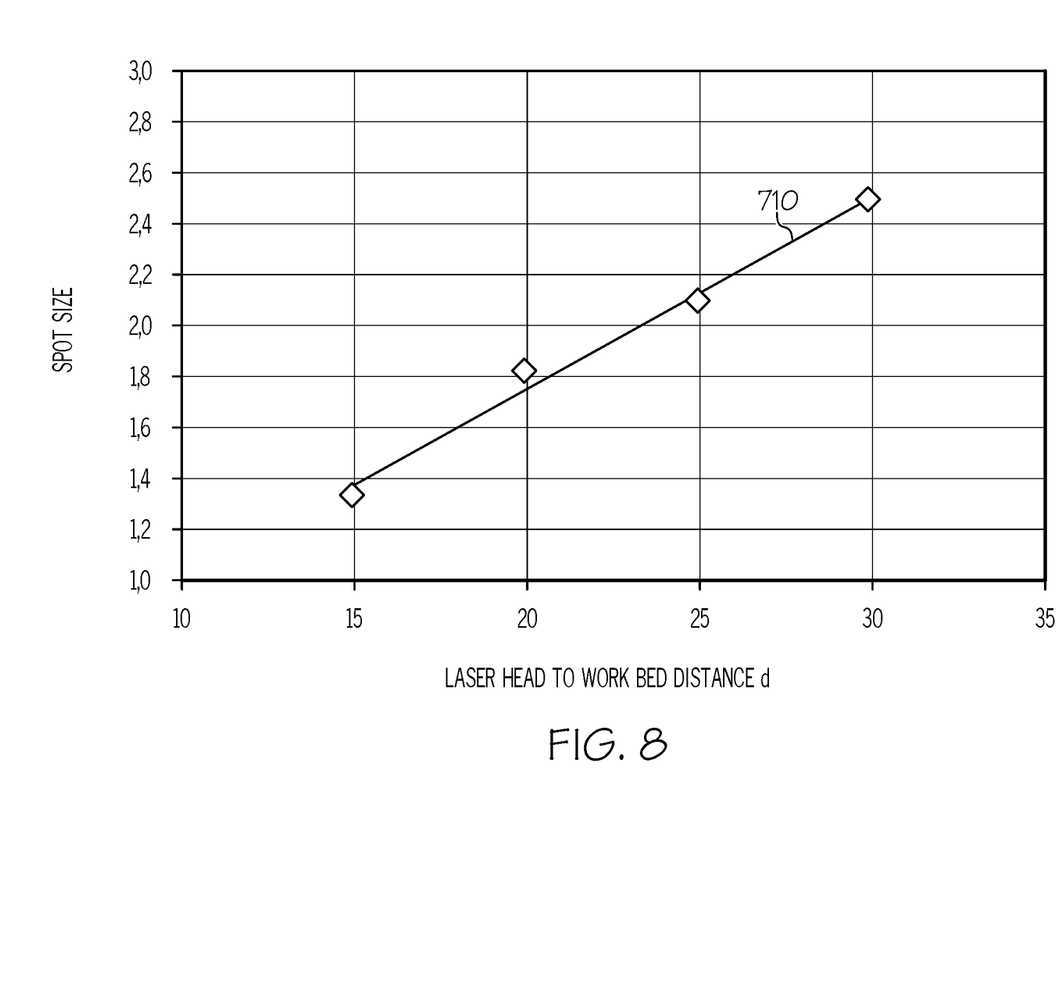
FIG. 8 depicts an illustrative representation of the correlation between the spot size and the laser-head-to-work-bed distance, according to one or more embodiments shown and described herein.

Referring briefly to FIG. 8, an illustrative representation of the correlation between the spot size and the laser-head-to-work-bed distance is depicted. In particular, a linear regression 710 is determined and graphically illustrated. Now for each laser-head-to-work-bed distance a corresponding spot size may be determined even though an actual measurement of the spot size may not exist.

In some embodiments, once a correlation between the laser-head-to-work-bed distance and spot size for laser beam of a particular machine may be determined, the correlation may be stored within the memory of the electronic control unit and used when processing a substrate. For example, CNC code may be uploaded for a laser cutting process on the laser machine. The CNC code may specify one or more spot sizes to use during the laser cutting process as well as the X-axis and Y-axis translation steps for carrying out the cutting operation. When the electronic control unit of the laser machine executes the CNC code, the laser machine may utilize the correlation factors or equations determined for the laser machine to set the Z-axis position (i.e., the laser-head-to-work-bed distance) of the laser head to generate required spot size for the laser beam.

As mentioned above, by using spot size as a parameter with or in place of Z-axis positioning, the CNC code may be readily implemented on a variety of laser machines, which may require different laser-head-to-work-bed distances for generating particular spot sizes with the laser. For example, a first laser machine may require that the Z-axis position be set at a first distance to generate a laser beam spot size having a width W and a second laser machine may require that the Z-axis position be set at a second distance to generate a laser beam spot size having the same width W. Generally, the CNC code would need to be written specifically for each laser machine or manually updated and/or calibrated when uploaded to each of the laser machines. However, using the systems and methods described herein, the same CNC code may be uploaded to a variety of laser machines without additional calibration or tailoring steps.

By way of a further example, when initializing a laser machine to process a substrate, the machine may automatically perform two or more passes of the laser over the knife-edge and power meter with the laser head at different distances from the work-bed. The electronic control unit of the laser machine may receive the power signals from the power meter and determine a spot size for each of the distances run during the initialization process. Then, a correlation between the laser-head-to-work-bed distance and the spot size for each of the distances may be determined and stored within the memory of the electronic control unit. A substrate having a predetermined thickness may be positioned on the work bed and the CNC code for the desired processing of the substrate loaded into the electronic control unit. As the electronic control unit executes the CNC code and processes the substrate, the electronic control unit may access the correlation (e.g., factors or equation) to determine the necessary laser-head-to-work-bed distance (e.g., Z-axis position) to generate the laser beam spot size defined in the CNC code for processing the substrate. In situations, the laser-head-to-work-bed distance may be offset by the predetermined thickness of the substrate in order to translate (i.e., along the Z-axis) the laser beam spot size from the surface of the work-bed to the surface of the substrate as the correlation may be determined at the surface of the work bed where the knife-edge and power meter are integrated.

It should now be understood that by translating the laser beam from the blocked portion 172 across the knife-edge and into the transmission portion 174 a power profile may be generated for the laser beam. From the power profile, the spot size (i.e., the width or diameter) of the laser beam may be determined for the particular laser-head-to-work-bed distance. These data points may be stored within the memory of the electronic control unit and/or the computing device for later lookup or analysis. Analysis of the data points may include determining a linear regression for a set of data points thereby generating a correlation between a distance value and spot size for the working range of the laser machine. The correlation may allow CNC code for processing (e.g., cutting) a substrate to be freely transferred from one laser machine to another laser machine. That is, a spot size may be correlated to the corresponding laser-head-to-work-bed distance for the particular machine. For example, in embodiments, one machine may generate a spot size using a first distance whereas a second laser machine may generate the same spot size using a second distance. By using the correlation (e.g., a linear or polynomial function representing the calculated relationship between laser head to work bed distance and spot size), the desired spot size may be generated by various laser machines without needing to alter the CNC code for each particular laser machine.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A laser system comprising:
   an electronic control unit comprising a processor and a non-transitory machine readable memory;
   a manipulable support communicatively coupled to the electronic control unit such that control signals generated by the electronic control unit control movement of the manipulable support;
   a laser head configured to output a laser beam;
   a work bed positioned opposite the laser head such that the laser beam output by the laser head is directed onto the work bed;
   a power meter communicatively coupled to the electronic control unit and integrated within the work bed;
   a ranging device configured to generate distance signals corresponding to a first distance from the laser head to the work bed;
   a knife edge plate positioned between the power meter and the laser head, wherein the knife edge plate forms a blocked portion and a transmission portion defined by a knife edge extending across the power meter; and
   a machine-readable instruction set stored in the non-transitory machine readable memory that causes the laser system to perform at least the following when executed by the processor:
      position the laser head at a first distance from the power meter based on the distance signals from the ranging device;
      cause the laser head to output the laser beam;
      translate the laser head across the power meter, wherein the laser beam is translated from the blocked portion across the knife edge into the transmission portion or the laser beam is translated from the transmission portion across the knife edge into the blocked portion;
      receive power signals from the power meter as the laser beam is translated across the power meter; and
      calculate a spot size for the laser beam based on the power signals received from the power meter.

2. The laser system of claim 1, wherein the machine-readable instruction set, when executed, further causes the processor to store the spot size and the first distance in the non-transitory machine-readable memory.

3. The laser system of claim 1, wherein the machine-readable instruction set, when executed, further causes the processor to:
   position the laser head at a second distance from the power meter;
   cause the laser head to output the laser beam;
   translate the laser head across the power meter, wherein the laser beam is translated from the blocked portion across the knife edge into the transmission portion or the laser beam is translated from the transmission portion across the knife edge into the blocked portion;
   receive the power signals from the power meter as the laser beam is translated across the power meter;
   calculate a second spot size for the laser beam at the second distance based on the power signals received from the power meter; and
   store the second spot size and the second distance in the non-transitory machine readable memory.

4. The laser system of claim 3, wherein the machine-readable instruction set, when executed, further causes the processor to:
   retrieve data points corresponding to the spot size, the first distance, the second spot size and the second distance; and
   compute a linear regression between the data points, wherein the linear regression defines a correlation factor for the spot size to a distance defined from the laser head to the work bed.

5. The laser system of claim 1, wherein the machine-readable instruction set, when executed, further causes the processor to:
   determine power values from the power signals received from the power meter;
   determine a first power value occurring at a first percentage of a maximum power value and a second power value occurring at a second percentage of the maximum power value; and
   determine the spot size based on a displacement of the laser beam during translation from the first power value to the second power value.

6. The laser system of claim 5, wherein the machine-readable instruction set, when executed, further causes the processor to:
   fit the power values from the power signals to an error-function.

7. The laser system of claim 1, wherein the laser head includes a laser and the laser is a $CO_2$ laser.

8. The laser system of claim 1, wherein the power meter includes a thermopile power sensor.

9. A method for automatically measuring and correlating a spot size of a laser beam to a laser-head-to-work-bed distance, the method comprising:
   positioning a laser head at a first distance from a work bed, wherein the work bed includes a power meter integrated within the work bed;
   causing the laser head to output the laser beam;
   translating the laser head across the power meter, wherein the laser beam is translated from a blocked portion across a knife edge into a transmission portion or the laser beam is translated from the transmission portion across the knife edge into the blocked portion;

receiving power signals from the power meter as the laser beam is translated across the power meter;

calculating the first spot size for the laser beam based on the power signals received from the power meter;

positioning the laser head at a second distance from the power meter;

causing the laser head to output the laser beam;

translating the laser head across the power meter, wherein the laser beam is translated from the blocked portion across the knife edge into the transmission portion or the laser beam is translated from the transmission portion across the knife edge into the blocked portion;

receiving the power signals from the power meter as the laser beam is translated across the power meter;

calculating a second spot size for the laser beam at the second distance based on the power signals received from the power meter;

storing the second spot size and the second distance in a non-transitory machine readable memory;

retrieving data points corresponding to the first spot size, the first distance, the second spot size and the second distance; and computing a linear regression between the data points, wherein the linear regression defines a correlation factor for the first spot size and the second spot size to the first distance and the second distance of the laser head to the work bed.

10. The method of claim 9, further comprising storing the first spot size and the first distance in a non-transitory machine-readable memory.

11. The method of claim 9, further comprising:

adjusting the laser head to the first distance based on distance signals from a ranging device configured to generate the distance signals corresponding to the first distance from the laser head to the work bed.

12. The method of claim 9, wherein the laser head includes a laser and the laser is a $CO_2$ laser.

13. The method of claim 9, wherein the power meter includes a thermopile power sensor.

14. A method for automatically measuring and correlating a spot size of a laser beam to a laser-head-to-work-bed distance, the method comprising:

positioning a laser head at a first distance from a work bed, wherein the work bed includes a power meter integrated within the work bed;

causing the laser head to output the laser beam;

translating the laser head across the power meter, wherein the laser beam is translated from a blocked portion across a knife edge into a transmission portion or the laser beam is translated from the transmission portion across the knife edge into the blocked portion;

receiving power signals from the power meter as the laser beam is translated across the power meter;

determining power values from the power signals received from the power meter;

determining a first power value occurring at a first percentage of a maximum power value and a second power value occurring at a second percentage of the maximum power value; and determining the spot size based on a displacement of the laser beam during translation from the first power value to the second power value; and fitting the power values from the power signals to an error-function.

15. The method of claim 14, further comprising: a ranging device configured to generate distance signals corresponding to a first distance from the laser head to the work bed.

* * * * *

UNITED STATES PATENT AND TRADEMARK OFFICE
CERTIFICATE OF CORRECTION

PATENT NO. : 10,982,998 B2
APPLICATION NO. : 16/536559
DATED : April 20, 2021
INVENTOR(S) : Thomas Hackert et al.

It is certified that error appears in the above-identified patent and that said Letters Patent is hereby corrected as shown below:

On the Title Page

In Column 2, item (56), Other Publications, Line 2, delete "(1985." and insert -- (1985). --, therefor.

In Column 2, Primary Examiner, Line 1, delete "Hao Q Pham" and insert -- Hoa Q Pham --, therefor.

On page 2, in Column 2, item (56), Other Publications, Line 3, delete "Decives" and insert -- Devices --, therefor.

Signed and Sealed this
Twenty-fifth Day of July, 2023

Katherine Kelly Vidal
*Director of the United States Patent and Trademark Office*